Nov. 18, 1947.    J. W. MŸNSSEN ET AL    2,431,272
SELF-LOCKING EQUALIZING DRIVE
Filed Feb. 26, 1945    3 Sheets-Sheet 1
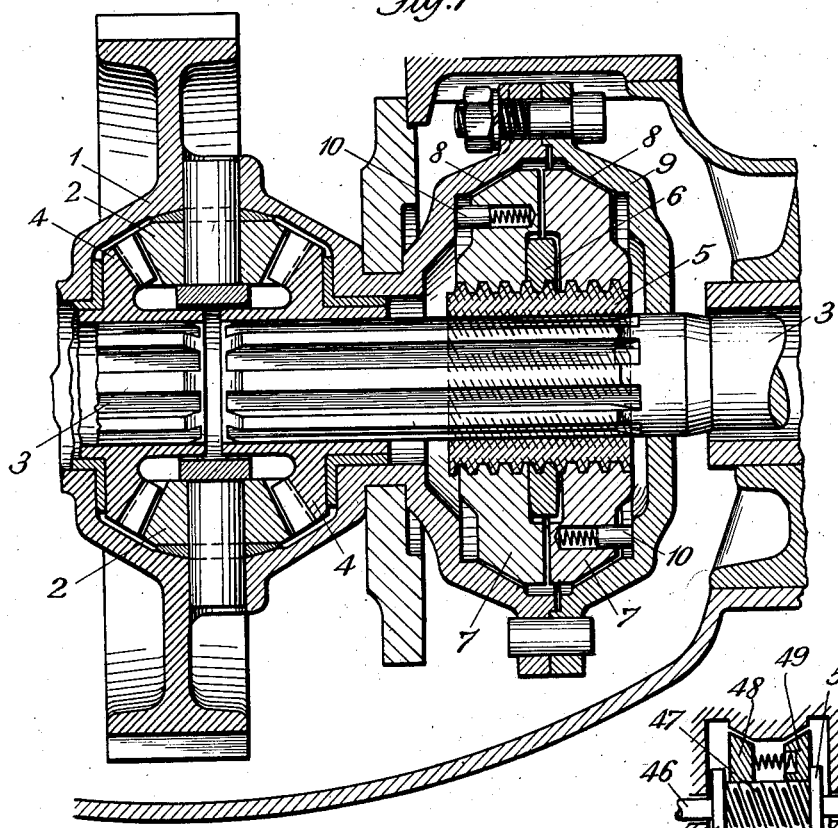
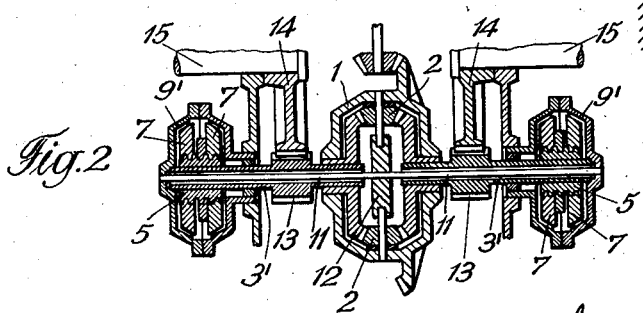
Inventors
Jacob W. Mÿnssen,
Max Ehrsam,
Karl Kunzi
by Sommers & Young
Attorneys

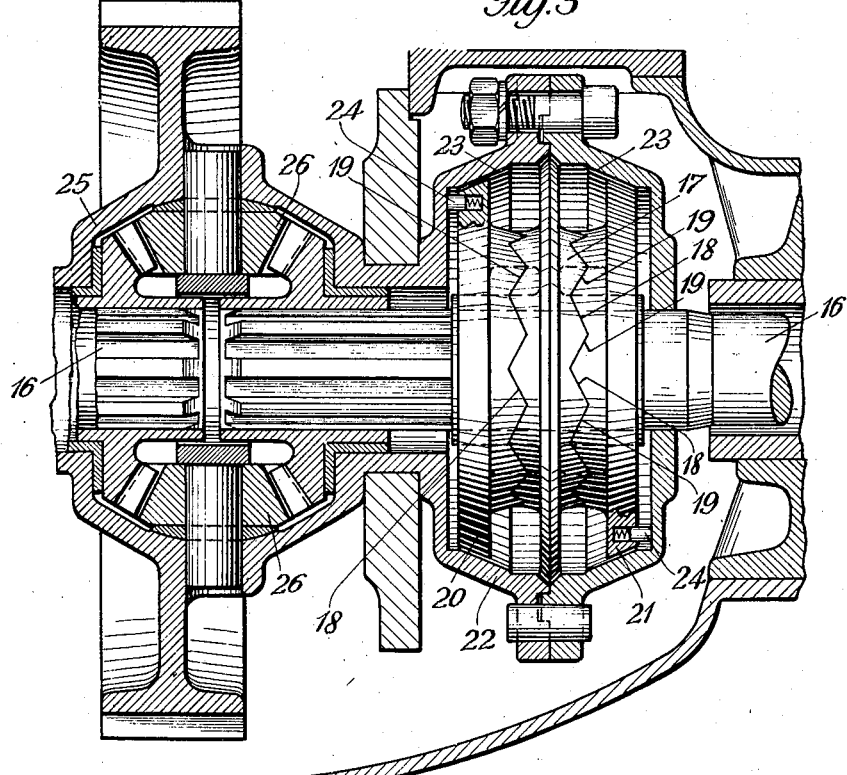
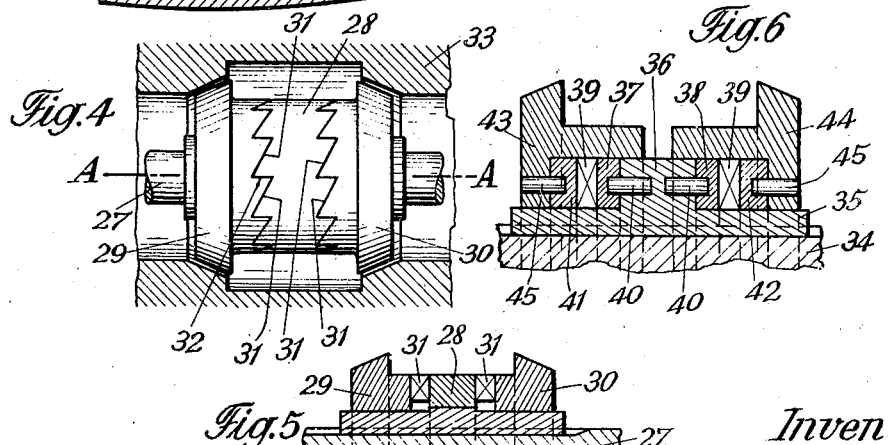

Patented Nov. 18, 1947

2,431,272

UNITED STATES PATENT OFFICE 2,431,272

SELF-LOCKING EQUALIZING DRIVE

Jacob Willem Mÿnssen, Max Ehrsam, and Karl Künzi, Schaffhausen, Switzerland, assignors to Aktiengesellschaft der Eisen- und Stahlwerke vormals Georg Fischer, Schaffhausen, Switzerland Application February 26, 1945, Serial No. 579,748
In France February 22, 1944

5 Claims. (Cl. 74—315)

This invention relates to a self-locking equalizing drive of improved construction for use in the construction of vehicles, particularly power driven vehicles, in which the two side shafts that are positively driven by the equalizing drive carry screw thread carrier members which share in the rotational movements of the side shafts and cooperate with other screw thread carrier members, in such manner, that one of the lastnamed screw thread carrier members, due to inertia effect of its own mass, performs relative rotational motion and a consequent axial displacement relative to the screw thread carrier member sustained by the respective side shaft as the speed of revolution of said shaft suddenly increases, said displacement being utilized for locking the equalizing drive.

The self-locking equalizing drive according to the present invention is distinguished in that each of the two side shafts that are positively driven by the equalizing drive carries a threaded member, which members share in the rotational movement performed by the respective side shaft and are operatively connected with other threaded members, each of which is made in two parts, in such manner, that one part at least of either of the said two lastnamed threaded members performs a rotational movement and a consequent axial displacing movement tending to increase the distance between said two lastnamed parts of the threaded member concerned, due to inertia effect of its own mass if the speed of revolution of this side shaft increases abruptly, said displacing movement being utilized for locking the equalizing drive.

Several embodiments of the present invention are ilustrated by way of example only in the accompanying drawings in which Fig. 1 shows a longitudinal section of a first embodiment of the present invention;

Fig. 2 shows a longitudinal section of a modified combination of elements forming an equalizing drive in which the parts serving for producing the locking effect are of like construction as the corresponding parts of Fig. 1;

Fig. 3 shows a longitudinal section of a second embodiment of the present invention exemplifying another equalizing drive;

Fig. 4 shows a third embodiment of the present invention exemplifying a further equalizing drive by means of elements functioning to effect the self-locking of said drive;

Fig. 5 is a longitudinal section on the line A—A in Fig. 4 with said elements exposed;

Fig. 6 shows a longitudinal section of locking means corresponding in principle with the locking elements represented in Figs. 4 and 5 except of the arrangement of certain constructional details;

Fig. 7 is a sectional view of part of a further embodiment showing elements functioning to effect the self-locking of the equalizing drive.

Figure 8:
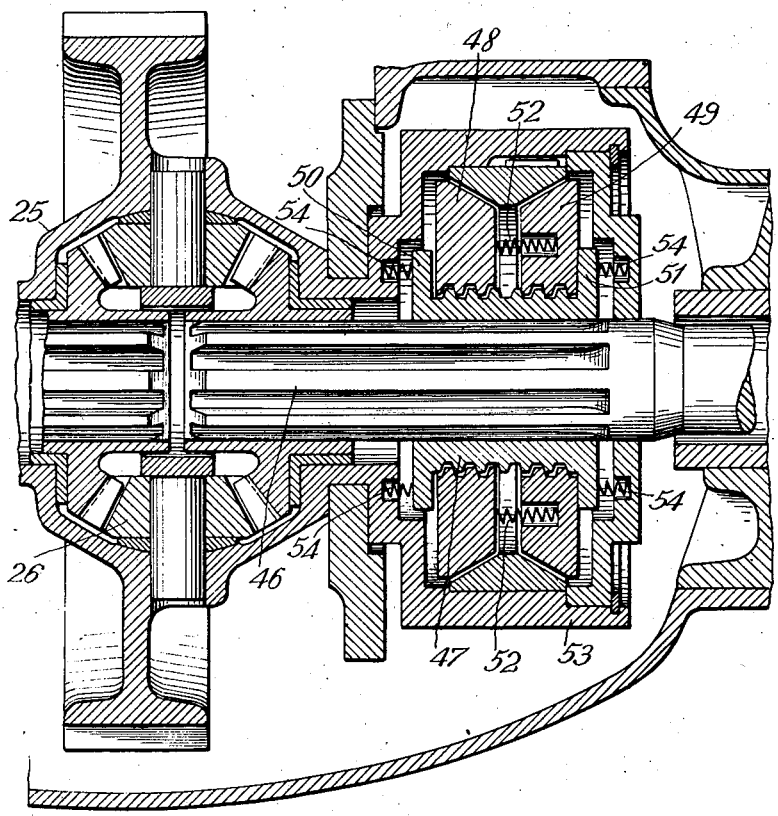
Fig. 8 is a longitudinal sectional view of the embodiment represented by Fig. 7.

In Fig. 1 of the drawings, the numeral 1 designates the revoluble carrier of the orbital gears of an equalizing drive according to the invention. The side shafts 3 of said drive are coupled to bevel wheels 4 and carry threaded elements in form of screw thread carrier rings 5. The pitch of the threads of the screw thread carrier rings 5 is so great that self-locking is avoided. The side shafts 3 and the screw thread carrier rings 5 are provided with grooves, in such manner, that said rings share in the rotational movement performed by the side shafts. To the threaded portion of the screw thread carrier rings 5 stop collars 6 are screwed, in such manner, that the collars are situated in the middle of the rings.

For the purpose of firmly frictionally engaging the stop collars 6 with the screw thread the diameter of the screw bore of the collars is somewhat reduced and the collars are heated prior to screwing the collars into position and are then screwed home in heated condition so that between the said two parts shrinking pressure is produced. The stop collars 6 can, however, be secured in position also by welding, soldering or welding and soldering combined, etc. The two threaded portions of the screw thread carrier ring 5 being separated by a stop collar 6 each carry a screw nut 7 so that the two nuts form together a two-part threaded member.

The screw nuts 7 form together an outer circumference of a cross section similar to a truncated cone and are surrounded by a casing 9 which is provided on the inside with two hollow superimposed cones 8 and is coupled to the revoluble carrier 1 of the orbital gears 2. The screw nuts 7 are provided on their front faces with spring bolts 10 which bear on mating set backs on the casing 9 under slight pressure.

As the vehicle passes through a curve either of the screw nuts 7 is rotationally displaced until it bears by inertia effect of its own mass against the stop collar 6, whereas the second nut 7 tends to separate from the stop collar 6. However, this tendency is counteracted by the spring bolts 10 of the respective screw nut 7, in consequence whereof the respective screw nut is turned along by the screw thread carrier ring 5 after the screw nut has performed a small rotational movement and the spring bolt 10 has simultaneously been stressed, prior to coupling engagement between the two screw nuts 7 and the casing 9 is effected.

In the event of the speed of revolution of one of the side shafts rising abruptly as may happen if one of the wheels is skidding the corresponding screw nut 7 is prevented from suddenly sharing in this increased speed of revolution due to inertia of its own mass, owing to which relative rotation to the screw thread carrier ring 5 and thus axial shifting movement of this nut relative to the ring takes place, so that the dstance between the said two screw nuts is altered and the nuts are coupled to the casing 9. The declutching takes place as soon as the speeds of revolution of the two side shafts 3 differ owing to the vehicle running through curves.

In the embodiment of the present invention as shown in Fig. 2 the casings 9' are coupled to the carrier 12 carrying the orbital gears 2 by means of shafts 11 that extend through side shafts 3' which in this case are in the form of hollow shafts. On the other hand the carrier 12 is rigidly connected to the revoluble carrier 1 of the orbital gears 2. The hollow side shafts 3' carry pinions 13 which are in mesh with gears 14. The gears 14 are secured to axle stubs 15 of the vehicle. The hollow shafts 3' support the screw thread carrier rings 5 with which two screw nuts 7, each of which is associated with a threaded member, are threadedly connected and which are surrounded by the casings 9'. When, for instance, the vehicle wheel connected to the left-hand stub axle 15 in Fig. 2 starts skidding, it is rotated by the pinion 13 at an abnormal high speed, whereupon the screw nuts 7 are moved away from each other and are coupled with the casing 9 with the same effect as described with reference to Fig. 1, and the return of the screw nuts out of engagement with the casing 9 occurs in the same manner as in Fig. 1.

In the embodiment of the invention shown in Fig. 3 the side shafts 16 carry screw thread carrier rings 17 which share in the rotational movements performed by the side shafts. Each of the two end faces of each screw thread carrier ring 17 supports a right hand multiple thread and a left hand multiple thread respectively. The individual screw threads of short length of the right hand thread are designated by 18 and the individual left hand screw threads of short length are designated by 19. The pitch of the screw threads is so great that self-locking is prevented from arising.

On each extended hub portion of each screw thread carrier ring 17 screw nuts 20, 21 respectively are loosely mounted for rotation and one end face of each nut is provided with a screw thread which is complementary to the adjacent screw thread on the respective screw thread carrier ring 17. The screw nuts 20 and 21 form together the two-part threaded member. The outer circumference of the screw nuts 20 and 21 is in form of a truncated cone and is surrounded by a casing 22 having hollow conical coupling flanges 23. The removed end faces of the screw nuts 20, 21 accommodate spring bolts 24 which bear against mating setbacks on the casing 22. The casing 22 is coupled to the carrier 25 of the orbital gears 26.

As the vehicle passes through a curve the screw nuts 20, 21 are maintained in mesh with the screw threads on the screw thread carrier ring 17 by means of the spring bolts 24 and as either of the side shafts 16 begins to skid the screw nuts are unable suddenly to share in the increased speed of revolution of the respective side shaft, due to inertia effect of their own mass. Consequently relative rotation takes place between the screw thread carrier ring 17 and the screw nuts 20, 21 so that the distance between said nuts is increased and the nuts are coupled to the casing 22. The coupling is disconnected as soon as the coupled wheel begins to lead on the other wheel.

In the embodiment of the present invention shown in Figs. 4 and 5 the numeral 27 designates a side shaft carrying a screw nut 28 which is secured against rotation relative to the side shaft 27. On both sides of the screw thread carrier ring 28 screw nuts 29, 30 respectively are arranged which are loosely mounted for rotation on the hub of the screw thread carrier ring 28 being prolonged on both sides. The screw nuts 29, 30 form together the two-part threaded member. The screw thread carrier ring 28 is provided on each of its two end faces with a multiple thread portion the individual threads 31 of which are of short length and ascend in the same direction.

The screw threads 31 are limited by setbacks 32 that extend parallel with the direction of the axis. The screw threads on the screw nuts 29, 30 interengage with those on the screw thread carrier ring 28 and this interengagement can be securely maintained by means of spring bolts in the same manner as in the embodiment shown in Figs. 1 to 3. Alternatively the spring bolts may be arranged on a sliding ring which is adapted to bear on an oppositely disposed end face on the casing surrounding the screw nuts. If the side shaft 27 skids in the clockwise direction the screw nut 30 is moved along by the screw thread carrier ring 28, whereas between the screw thread carrier ring 28 and the screw nut 29 relative rotation takes place due to inertia effect of the mass of this nut, so that the distance between the screw nuts 29, 30 is enlarged and thus the nuts are coupled to the casing 33. In the side shaft 27 skidding in the counterclockwise direction, the screw nut 29 is moved along by this shaft, in consequence whereof, relative rotation is produced between the screw thread carrier ring 28 and the screw nut 30 and thus coupling engagement between the ring 30 and the casing 33 is effected.

The embodiment of the invention as shown in Fig. 6 is built on the same general principle as that shown in Figs. 4 and 5, that is, except of certain details of merely constructional nature. A ring 35 which is secured against rotation relative to a side shaft 34 is provided with a collar 36 on the side faces of which bear screw thread carrier discs 37, 38. The numeral 39 refers to screw threads that have the same construction as the corresponding screw thread carrier discs of the embodiment shown in Figs. 4 and 5. These former screw thread carrier discs are secured against rotation by means of locking bolts 40. In engagement with the screw thread carrier discs 37, 38 are screw thread carrier discs 41, 42 which bear on outer limiting walls of cylindrical bores in the screw nuts 43, 44. These screw thread carrier discs are secured to the screw nuts by means of locking bolts 45.

In the embodiment shown in Figs. 7 and 8, the numeral 46 designates a side shaft which carries a screw thread carrier cylinder 47 which has steeply ascending screw threads and is secured to the side shaft 46 against rotation but is free to shift relative to this shaft in the axial direction. The cylinder 47 is yieldingly held in a central position between the end walls of casing 53 by springs 54. To the screw thread carrier cylinder 47 two screw nuts 48, 49 are screwed which form the two-part threaded member. To the two ends of the screw thread carrier cylinder 47 collars 50, 51 resuectively are fixed. Between the screw nuts 48, 49 weak springs 52 are arranged.

Between the collars 50, 51 on the screw thread carrier cylinder 47 and a rotating casing 53 connected to the revoluble carrier 25 of the orbital gears be arranged by means of which the screw thread carrier cylinder 47 is resiliently maintained in a medial position. In the side shaft 46 skidding in the clockwise direction the screw nut 49 first bears on the collar 51 on the screw thread carrier 47, whereupon the screw nut 48 approaches on the screw nut 49 by inertia effect of its own mass against the action of the springs 52, whereby the conical coupling portion of the screw nuts 48, 49 enters into coupling engagement with the hollow cones of the casing 53. In the side shaft 46 skidding in the counterclockwise direction the screw nut 48 bears against the collar 50 on the screw thread carrier cylinder 47, whereupon the screw nut 49 is approached on the screw nut 48 until coupling engagement between both screw nuts 48, 49 and the casing 53 takes place.

The manner of operation of the device illustrated in Figs. 7 and 8 is similar to that described in connection with the previous examples with the difference that the screw nuts 47, 48 are moved towards each other for coupling with the casing 53 instead of being moved away from each other.

We claim:

1. In a self-locking equalizing drive for power-driven vehicles, a drive element, two rotatable side shafts, positive driving means intercalated between said drive element and said side shafts, a screw thread carrier member carried by each said side shaft, driving means arranged between said thread carrier members and said side shafts for capacitating said carrier members to share in the rotational movements of the respective said shaft, a two-part massive threaded member meshing in each said screw thread carrier member for capacitating either of said associated massive parts to shift by relative rotation to the respective said thread carrier member axially relative to said carrier member, thereby to increase the distance between said associated parts due to inertia effect of the mass of the respective then rotating part as the speed of revolution of the corresponding side shaft increases abruptly, and to lock the equalizing drive by action of said axial shifting movement.

2. In a self-locking equalizing drive for power-driven vehicles, a drive element, two rotatable side shafts, positive driving means intercalated between said drive element and said side shafts, a screw thread carrier ring carried by each said side shaft, a stop collar arranged centrally on said screw thread for subdividing said thread into two thread portions, driving means arranged between said thread carrier members and said side shafts for capacitating said carrier members to share in the rotational movements of the respective said shaft, a screw nut intermeshing with each said thread portion on said thread carrier ring, thereby to form a two-part massive threaded member, each of said associated massive parts being capacitated to shift by relative rotation to the respective said thread carrier member axially relative to said carrier member, thereby to increase the distance between said associated parts due to inertia effect of the mass of the respective then rotating part as the speed of revolution of the corresponding side shaft increases abruptly, and to lock the equalizing drive by action of said axial shifting movement.

3. In a self-locking equalizing drive for power-driven vehicles, a drive element, two rotatable side shafts, positive driving means intercalated between said drive element and said side shafts, a screw thread carrier member in form of a cylinder carried by each said side shaft, driving means arranged between said thread carrier members and said side shafts for capacitating said carrier members to share in the rotational movements of the respective said shaft, screw nuts constituting coupling elements intermeshing with said screw thread carrier cylinder in spaced relation to each other on both sides of the centre of said cylinder, thereby to form a two-part massive threaded member, two terminal collars on said cylinder, and compression springs extending between said nuts, each of said associated massive part being capacitated to shift by relative rotation to the respective said thread carrier member axially relative to said carrier member, thereby to increase the distance between said associated parts due to inertia effect of the mass of the respective then rotating part as the speed of revolution of the corresponding side shaft increases abruptly, and to lock the equalizing drive by action of said axial shifting movement.

4. In a self-locking equalizing drive for power-driven vehicles, a drive element, two rotatable side shafts, positive driving means intercalated between said drive element and said side shafts, a screw thread carrier member in form of a ring carried by each said side shaft, two screw threads carried by each end face on said ring, one of said pairs of screw threads on either said face ascending in the right hand and the other in the left hand direction, driving means arranged between said thread carrier members and said side shafts for capacitating said carrier members to share in the rotational movements of the respective said shaft, other screw thread carrier parts forming in an associated pair a two-part massive threaded member mating said screw threads on said ring for capacitating either of said associated massive parts to shift by relative rotation to the respective said thread carrier member axially relative to said carrier member, thereby to increase the distance between said associated parts due to inertia effect of the mass of the respective then rotating part as the speed of revolution of the corresponding side shaft increases abruptly, and to lock the equalizing drive by action of said axial shifting movement.

5. In a self-locking equalizing drive for power-driven vehicles, a drive element, two rotatable side shafts, positive driving means intercalated between said drive element and said side shafts, a screw thread carrier member in form of a ring carried by each said side shaft, a multiple thread carried by each end face on said ring, said multiple threads on both said end faces ascending in the same direction. driving means arranged between said thread carrier members and said side shafts for capacitating said carrier members to share in the rotational movements of the respective said shaft, other screw thread carrier parts forming in an associated pair a two-part massive threaded member mating with said screw threads on said ring for capacitating either of said associated massive parts to shift by relative rotation to the respective said thread carrier member axially relative to said carrier member, thereby to increase the distance between said associated parts due to inertia effect of the mass of the respective then rotating part as the speed of revolution of the corresponding side shaft increases abruptly, and to lock the equalizing drive by action of said axial shifting movement.

JACOB WILLEM MŸNSSEN.
MAX EHRSAM.
KARL KÜNZI.

REFERENCES CITED

The following references are of record in the file of this patent:

UNITED STATES PATENTS

| Number | Name | Date |
|---|---|---|
| 1,361,895 | Nogrady | Dec. 14, 1920 |
| 1,585,438 | Taylor et al. | May 18, 1926 |
| 1,586,861 | Taylor | June 1, 1926 |